(12) United States Patent
Woytowitz

(10) Patent No.: US 9,307,620 B2
(45) Date of Patent: Apr. 5, 2016

(54) DATA RELAY FOR A CONTROLLER

(71) Applicant: Hunter Industries, Inc., San Marcos, CA (US)

(72) Inventor: Peter John Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 178 days.

(21) Appl. No.: 14/246,660

(22) Filed: Apr. 7, 2014

(65) Prior Publication Data

US 2014/0217928 A1 Aug. 7, 2014

Related U.S. Application Data

(63) Continuation-in-part of application No. 13/942,000, filed on Jul. 15, 2013, now Pat. No. 8,838,021, which is a continuation of application No. 13/597,016, filed on Aug. 28, 2012, now Pat. No. 8,509,683, which is a continuation of application No. 12/621,330, filed on Nov. 18, 2009, now Pat. No. 8,275,309.

(60) Provisional application No. 61/821,141, filed on May 8, 2013.

(51) Int. Cl.
| | |
|---|---|
| H04B 3/36 | (2006.01) |
| H05B 37/02 | (2006.01) |
| H04L 25/02 | (2006.01) |
| F21V 23/04 | (2006.01) |

(52) U.S. Cl.
CPC ........ H05B 37/0272 (2013.01); H04L 25/0282 (2013.01); F21V 23/0442 (2013.01)

(58) Field of Classification Search
CPC ............ F21V 23/0442; F21V 23/0435; F21V 23/0464

USPC .......... 455/14, 7, 11.1, 12.1, 13.1, 17, 22, 23, 455/422.1, 403, 414.1–414.4, 550.1, 426.1, 455/426.2, 418–420, 454, 9, 500, 517, 523, 455/557; 315/149, 150, 318, 184, 185 R; 370/310, 315, 328, 329, 252
See application file for complete search history.

(56) References Cited

U.S. PATENT DOCUMENTS

| | | | |
|---|---|---|---|
| 7,805,221 B2 | 9/2010 | Nickerson | |
| 8,275,309 B2 | 9/2012 | Woytowitz | |
| 8,509,683 B2 | 8/2013 | Woytowitz | |
| 2010/0145530 A1 | 6/2010 | Nickerson et al. | |
| 2010/0280677 A1* | 11/2010 | Budike, Jr. ......... | H05B 37/0272 700/296 |
| 2010/0312404 A1 | 12/2010 | Nickerson | |
| 2011/0137472 A1 | 6/2011 | Hitt et al. | |
| 2011/0238227 A1 | 9/2011 | Hern et al. | |
| 2011/0238230 A1 | 9/2011 | Runge et al. | |
| 2011/0270449 A1 | 11/2011 | Nickerson et al. | |
| 2013/0303082 A1 | 11/2013 | Woytowitz | |
| 2014/0001963 A1* | 1/2014 | Chobot ................ | H05B 37/02 315/153 |

* cited by examiner

*Primary Examiner* — Keith Ferguson
(74) *Attorney, Agent, or Firm* — Knobbe Martens Olson & Bear LLP

(57) ABSTRACT

A two-conductor hard-wired communications link accepts a value of at least one parameter from an environmental sensor in the form of data encoded on the conductors via current modulation. The sensor can be mounted in a location remote from a controller. A circuit connected to the sensor transmits an RF signal representing the value of the parameter detected by the sensor. A data relay connects to the hard-wired communication link of the controller. The data relay includes a receiver that receives the RF signal, and circuitry configured to extract the value of the parameter and to emulate a set of physical and protocol properties of the hard-wired communication link of the controller.

20 Claims, 8 Drawing Sheets

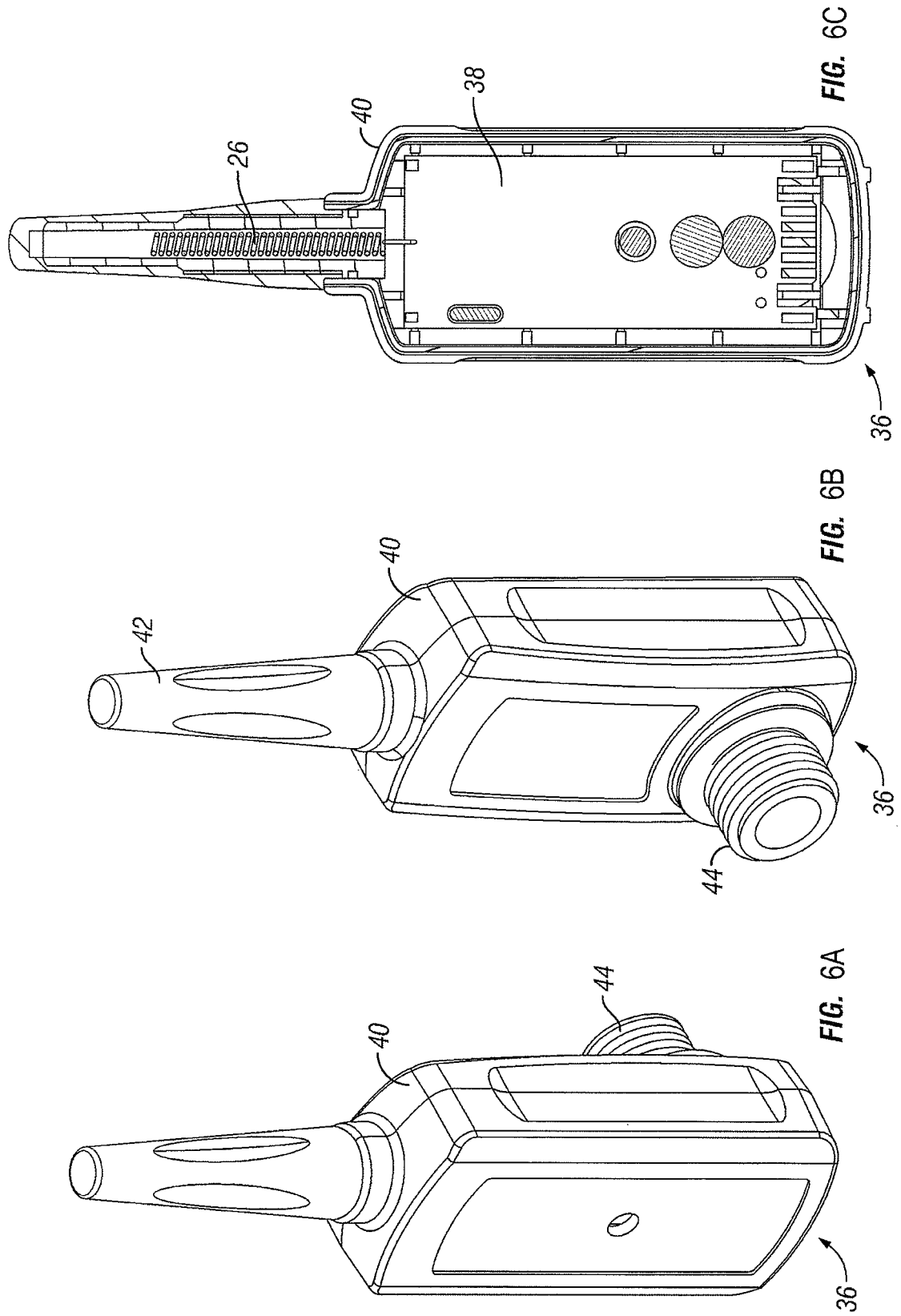

DATA RELAY FOR A CONTROLLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

A controller sometimes uses signals from remote environmental sensors. Typically the controller and the sensor communicate through a hard-wired connection. Many times the hard-wired connection uses the same pair of wires to supply power to the sensor, as it does to communicate information back to the controller. Other times separate wires are used for power and control. One of the reasons the communications link is typically a hard-wired connection is the fact that many times the controller is installed in a vandal-resistant metal cabinet that shields radio frequency (RF) signals, making it impractical to use a wireless communications link. Another reason that the communications link is typically a hard-wired connection is that an RF receiver circuit typically costs significantly more than a simple hard-wired receiver circuit.

Controllers conventionally retrieve data from the remote sensor using the two-conductor hard-wired connection. Typically a pair of wires carries both an excitation voltage to power the sensor as well as data in the form of a modulated current draw. Data containing environmental information of interest is communicated to the controller by modulating the amount of current drawn by the environmental sensor that is sending the data. Current modulation is typically more noise tolerance and affected less by long wire runs than a voltage modulated signal.

An irrigation controller sometimes uses signals from remote environmental sensors that detect rain events, temperature, solar radiation, wind speed, humidity, soil moisture, evapotranspiration, flow, or other parameters.

A lighting controller may use signals from remote sensors to determine when, for how long, in what area, and how bright lights are turned on. These sensors may include ambient light, motion, temperature, precipitation, or other sensors.

In one scenario an ambient light sensor would determine when a desired level of darkness occurred and turn on the lights at that time. Since many times parts of the area to be lighted are more shaded than others, it may be possible to install an ambient light sensor in each area, and individually control the lights in that area.

In another scenario, a motion sensor may determine when there is movement and alert the lighting controller. The lighting controller may respond to this signal by turning on some or all of the lights. Multiple motion sensors could be deployed to allow lights in certain area's to turn on when motion is sensed just in that area. In other embodiments, detected motion may cause lights to turn on if the ambient light is below a certain level.

In yet another scenario, a lighting controller might use a temperature sensor to determine if the ambient temperature is below a certain threshold, and if it is, slowly ramp the intensity of the lights. In another scenario, if snow is sensed, the lights might be turned to warm the light fixture and prevent the snow from building up on it.

Foregoing sensors or combinations thereof would typically be hard-wired into the lighting controller. Frequently, a pair of wires carries both excitation and data in the form of current draw. This is case with the ambient light sensor used with the LX-150 and LX-300 lighting controllers sold by FX Luminaire of San Marcos, Calif. It is also possible for an RS485 bus to be used for communication. Such is the case for the LUXOR Lighting Controller also sold by FX Luminaire. An RS485 bus would modulate voltage to communicate, and while power may be extracted from the bus itself, it may also be supplied via conductors separate from those carrying the data.

SUMMARY

In an embodiment, a data relay includes an RF receiver, a demodulator, a microcontroller, and a current modulator. The RF receiver is configured to receive an RF signal transmitted from a remote location representing data from a sensor. The demodulator retrieves a baseband data signal from the received RF signal. The microcontroller receives the baseband data signal and determines an actual value of at least one parameter of interest. The current modulator is controlled by the microcontroller and transmits the actual value of the parameter of interest to a controller on a pair of conductors by emulating a predetermined set of physical and protocol properties of a predetermined two-conductor hard-wired communication link of the controller. Alternately, a voltage modulator is controlled by the microcontroller and transmits the actual value of the parameter of interest to a controller on one or more conductors by emulating a predetermined set of physical and protocol properties of a predetermined hard-wired communication link of the controller.

In another embodiment, an irrigation system includes an irrigation controller, at least one environmental sensor, and a vandal resistant data relay. The irrigation controller includes a two-conductor hard-wired communications link for accepting an actual value of at least one parameter of interest from an environmental sensor in the form of data encoded on the conductors via current modulation. The environmental sensor is mounted in a location remote from the irrigation controller. A circuit is connected to the environmental sensor for transmitting an RF signal representing an actual value of a parameter of interest detected by the environmental sensor. The vandal resistant data relay is connected to the two-conductor hard-wired communication link of the irrigation controller. The vandal resistant data relay includes a receiver that receives the RF signal, and circuitry configured to extract the actual value of the parameter of interest and emulate a predetermined set of physical and protocol properties of the two-conductor hard-wired communication link of the irrigation controller.

In a further embodiment, a lighting system includes a lighting controller, at least one sensor, and a vandal resistant data relay. The lighting controller includes a hard-wired communications link for accepting an actual value of at least one parameter of interest from a sensor in the form of data encoded on the conductors via current or voltage modulation. The sensor is mounted in a location remote from the lighting controller. A circuit is connected to the sensor for transmitting an RF signal representing an actual value of a parameter of interest detected by the sensor. The data relay is connected to the hard-wired communication link of the lighting controller. The data relay includes a receiver that receives the RF signal, and circuitry configured to extract the actual value of the parameter of interest and emulate a predetermined set of physical and protocol properties of the hard-wired communication link of the lighting controller.

In certain embodiments, a lighting system is disclosed. The lighting system comprises a sensor configured to detect at least one parameter, a lighting controller comprising a hard-wired communications link and configured to accept a value of the at least one parameter from the sensor in the form of data encoded on conductors of the hard-wired communication link according to predetermined properties of the hard-wired communication link, where the sensor is located remotely from the lighting controller, and a data relay electrically connected to the hard-wired communication link. The data relay comprises a receiver configured to receive an RF signal representing a value of said at least one parameter detected by the sensor, and circuitry configured to extract said value from the received RF signal and encode the value on said conductors by emulating the predetermined properties.

In other embodiments, a lighting system is disclosed. The lighting system comprises at least one transmitting sensor comprising a sensor configured to detect at least one parameter and a radio frequency (RF) transmitter configured to transmit an RF signal representing a value of the at least one parameter detected by the sensor, a lighting controller comprising a hard-wired communications link and configured to accept the value from the sensor in the form of data encoded on conductors of the hard-wired communication link according to a predetermined set of physical and protocol properties of the hard-wired communication link, where the sensor is located remotely from the lighting controller, and a data relay electrically connected to the hard-wired communication link. The data relay comprises a receiver configured to receive the RF signal, and circuitry configured to extract the value from the received RF signal and encode the value on said conductors by emulating the predetermined set of physical and protocol properties.

In further embodiments, a lighting system is disclosed. The lighting system comprises at least one transmitting sensor comprising a sensor configured to detect at least one parameter of interest and a radio frequency (RF) transmitter configured to transmit an RF signal representing an actual value of the at least one parameter of interest detected by the sensor, a lighting controller comprising a hard-wired communications link and configured to accept the actual value of the at least one parameter of interest from the sensor in the form of data encoded on conductors of the hard-wired communication link via current or voltage modulation according to a predetermined set of physical and protocol properties of the hard-wired communication link, where the sensor is located remotely from the lighting controller, and a data relay electrically connected to the hard-wired communication link of the lighting controller. The data relay comprises a receiver configured to receive the RF signal, and circuitry configured to extract the actual value of the at least one parameter of interest from the received RF signal and encode the actual value of the at least one parameter of interest on the conductors of the hard-wired communication link via the current or the voltage modulation by emulating the predetermined set of physical and protocol properties of the hard-wired communication link of the lighting controller.

In an embodiment, the data relay emulates physical and protocol properties of the hard-wired communication link. In another embodiment, the lighting controller is configured to turn ON and OFF one or more lighting modules based at least in part on the value of the parameter. In a further embodiment, the sensor comprises one or more of an ambient light sensor, a motion sensor, an occupancy sensor, a proximity sensor, a vacancy sensor, a photodetector, an infrared (IR) sensor, an ultraviolet (UV) sensor, and a temperature sensor. In a yet further embodiment, the data relay encodes the value on the conductors by one of current modulation and voltage modulation. In an embodiment, the data relay further comprises a demodulator configured to extract the value from the received RF signal. In another embodiment, the data relay further comprises a processor configured to drive a modulator to emulate the predetermined set of physical and protocol properties. In a further embodiment, the modulator is configured to modulate the value onto the conductors. In a yet further embodiment, the lighting controller is housed within a vandal resistant housing. In an embodiment, the data relay is mounted outside the vandal resistant housing. In another embodiment, the data relay further comprises an antenna electrically coupled to the receiver. In a yet further embodiment, the antenna is configured to be embedded inside an outer protective jacket.

According to a number of embodiments, a data relay is disclosed. The data relay comprises a receiver configured to receive a wireless signal from a remote sensor. The wireless signal is responsive to a sensed condition relating to lighting control. The data relay further comprises a processor configured to process the received signal to determine data responsive to the sensed condition, and an output communicating with one or more conductors of a hard-wired communication link, where the processor is configured to emulate signals expected by a controller over the hard-wired communication link responsive to the data as if the controller were communicating over the hard-wired communication link with the remote sensor.

In an embodiment, the data relay further comprises a current modulator controlled by the processor and configured to modulate a value of the data onto the output. In another embodiment, the data relay further comprises a voltage modulator controlled by the processor and configured to modulate a value of the data onto the output. In a further embodiment, the data relay further comprises an antenna electrically connected to the receiver and configured to receive the wireless signal. In a yet further embodiment, the data relay further comprises a vandal resistant housing.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings, associated descriptions, and specific implementation are provided to illustrate embodiments and not to limit the scope of the disclosure.

FIGS. 6A, 6B and 6C are front isometric, rear isometric and vertical sectional views, respectively, of a data relay module according to certain embodiments.

DETAILED DESCRIPTION

The features of the inventive systems and methods will now be described with reference to the drawings summarized above.

The present invention provides a vandal resistant data relay which adapts a hard-wired data interface into a wireless infrastructure. While an embodiment described herein functions with an irrigation controller as part of an evapotranspiration (ET) based irrigation system and another embodiment functions with a lighting controller as part of a lighting system, the data relay could be used in other applications such as industrial automation. The described embodiments function with a controller that receives data encoded by modulating current on a two-wire hard-wired connection. However, the present invention can be adapted for use with other physical layers (wiring configurations and signal characteristics). In each of these applications, signals are brought into a controlling device, where these signals represent some useful piece of information which the controlling device uses to optimally achieve its function. In the case of an ET based irrigation controller, the information can represent, rain events, temperature, solar radiation, wind speed, humidity, soil moisture, evapotranspiration, flow, or other parameters. In the case of a lighting controller, the information could represent ambient light, temperature, detected motion, or other parameters.

An embodiment of the data relay adapts a control system designed for hard-wired data gathering into a wireless system, while maintaining vandal resistance. This allows the control system to be manufactured in its reduced cost version, without burdening every unit produced with the additional cost associated with the wireless communications capability. The data relay comprises an RF receiver or transceiver that gathers data from a wireless sensor (or other data retrieval device) comprising a transmitter (or transceiver), and then the data relay emulates the physical and protocol layers of the analogous hardwired sensor to the controller. This data relay functionality is transparent to the controller, i.e. the controller does not "know" that the actual sensor is wirelessly connected. This feature is advantageous in keeping the design of the controller free from hardware, protocol, and software variations.

Figure 1:
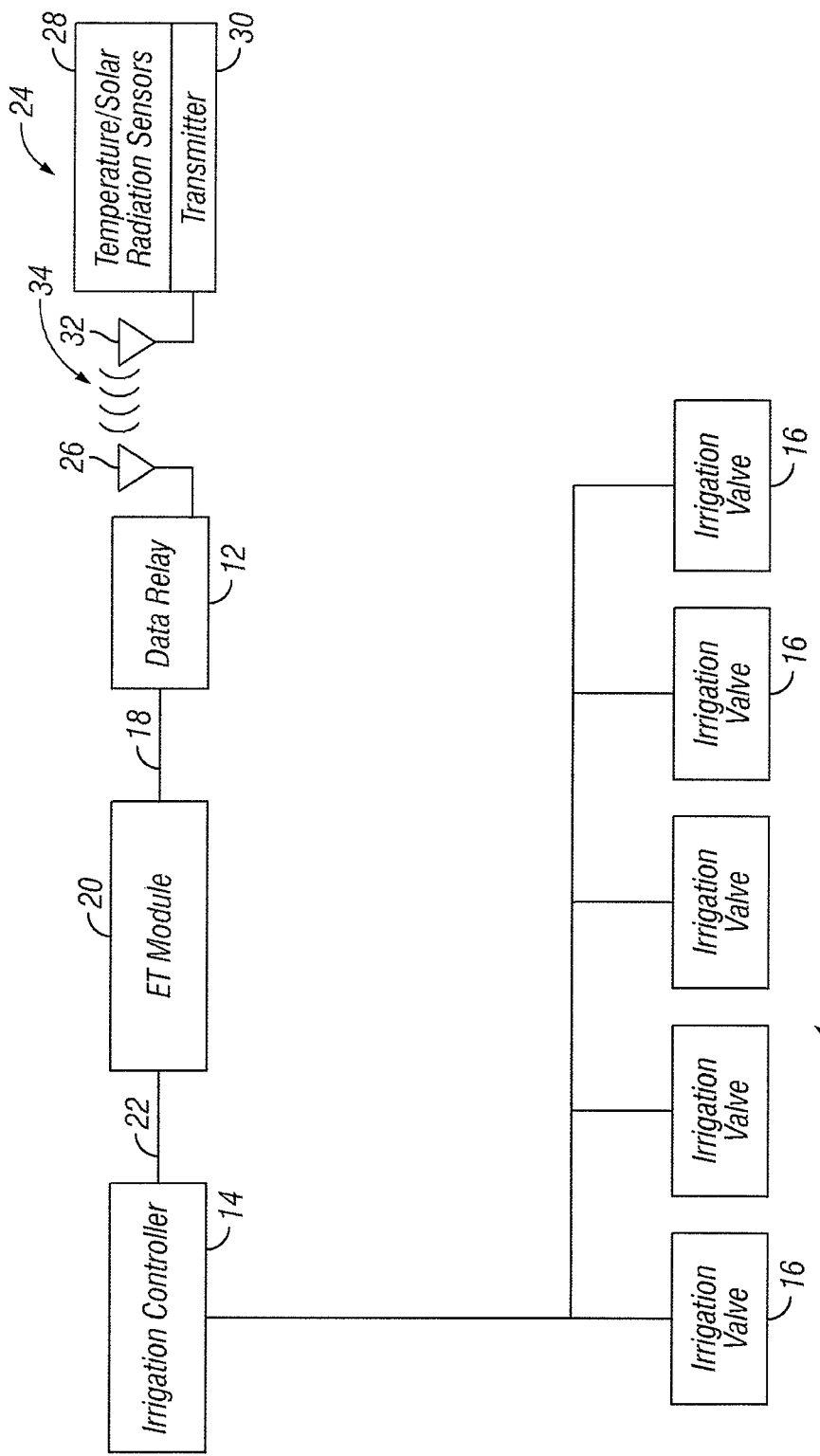
FIG. 1 is a block diagram of an exemplary irrigation system incorporating an embodiment of the data relay.

FIG. 1 is a block diagram of an exemplary irrigation system 10 incorporating an embodiment of the data relay 12. An irrigation controller 14 turns a plurality of irrigation valves 16 ON and OFF in accordance with a watering program. The data relay 12 is connected by a hard-wired connection 18 to an ET module 20 which is in turn connected by a hard-wired connection 22 to the irrigation controller 14. The data relay 12 receives RF signals 34 from a weather station 24 via antenna 26. The weather station 24 includes a plurality of environmental sensors 28 such as, for example, a temperature sensor, a humidity sensor, a barometer, an anemometer, a rain gauge, a soil moisture sensor, a solar radiation sensor, and the like. The weather station 24 includes processing circuitry for encoding the signals from the sensors and sending them wirelessly to the data relay 12 via transmitter 30 and antenna 32. Thus the irrigation system 10 has a wireless communications link represented diagrammatically by parallel electromagnetic (EM) propagation waves 34.

The irrigation controller 14 may be the Pro-C® manufactured by Hunter Industries, Inc. The ET module 20 and the weather station 28 may be the Solar Sync® units manufactured by Hunter Industries, Inc.

Figure 2:
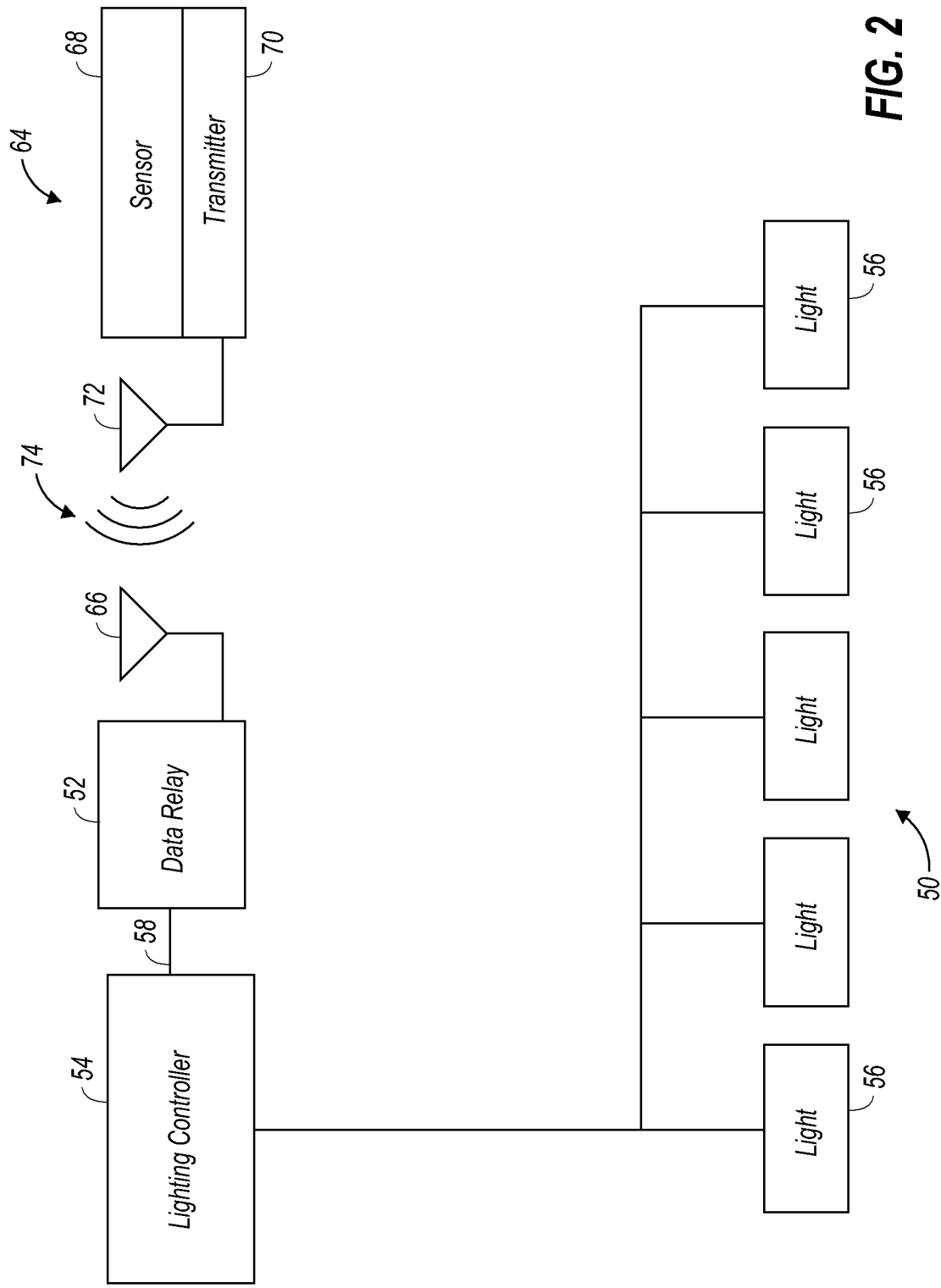
FIG. 2 is a block diagram of an exemplary lighting system incorporating an embodiment of the data relay.

FIG. 2 is a block diagram of an exemplary lighting system 50 incorporating an embodiment of a data relay 52. A lighting controller 54 powers a plurality of light fixtures or lighting modules 56 in accordance with a lighting schedule. The lighting fixtures 56 can be dimmable or non-dimmable and can comprise one or more of colored and/or white LEDs and/or incandescent lights. The data relay 52 is connected by a hard-wired connection 58 to the lighting controller 54. Examples of the lighting controller 54 are an LX-150/300 or a LUXOR, both available from FX Luminaire or others.

The data relay 52 receives RF signals 74 from a sensor station or sensing transmitter 64 via antenna 66. The sensing transmitter 64 includes at least one sensor 68 such as an ambient light sensor or a motion sensor. The sensing transmitter 64 further includes processing circuitry for encoding the signals from the sensors 68 and sending them wirelessly to the data relay 52 via transmitter 70 and antenna 72. Thus the lighting system 50 has a wireless communications link represented diagrammatically by parallel EM propagation waves 74.

Figure 3:
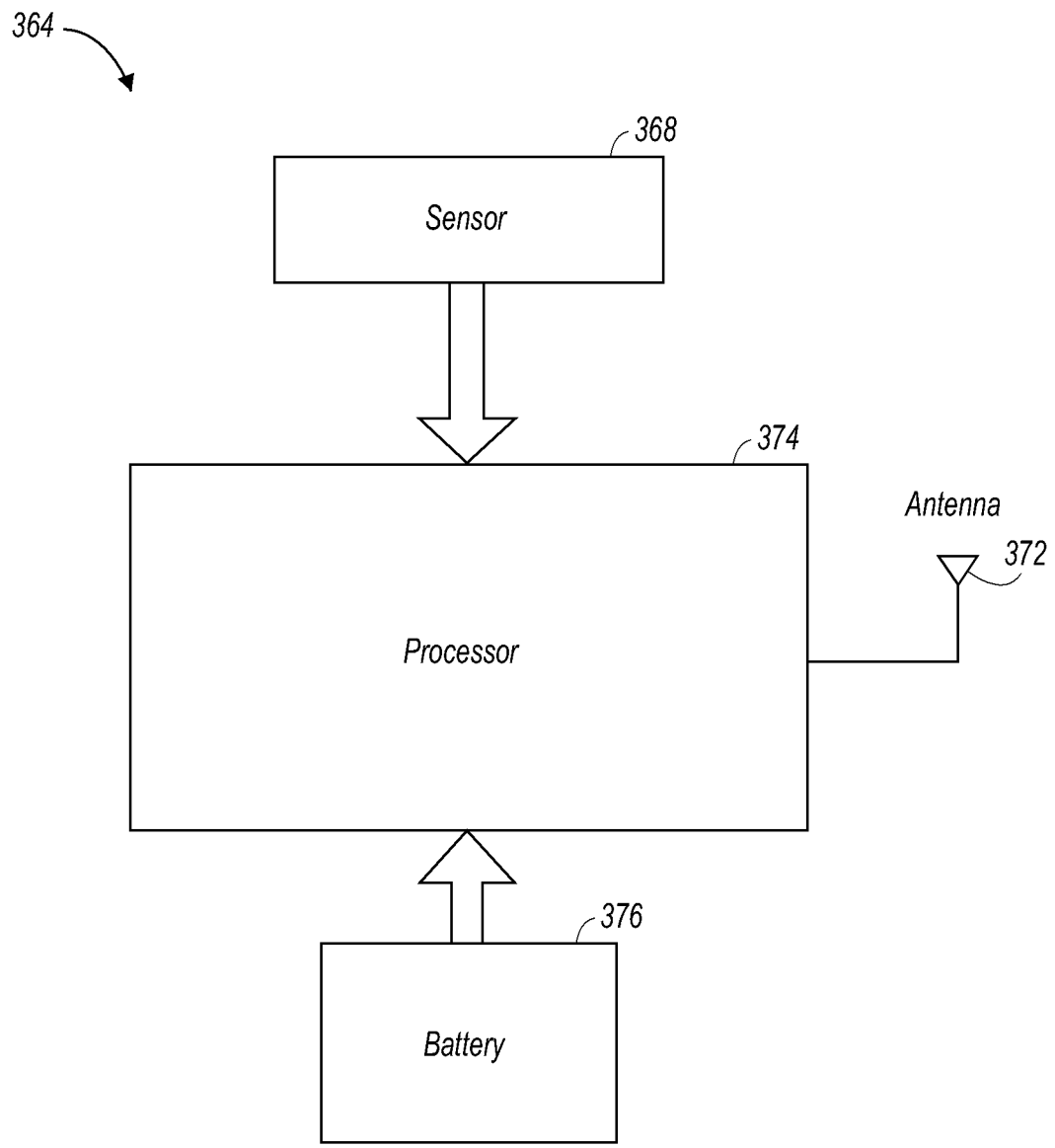
FIG. 3 is a block diagram of an exemplary sensing transmitter, according to certain embodiments.
Figure 4:
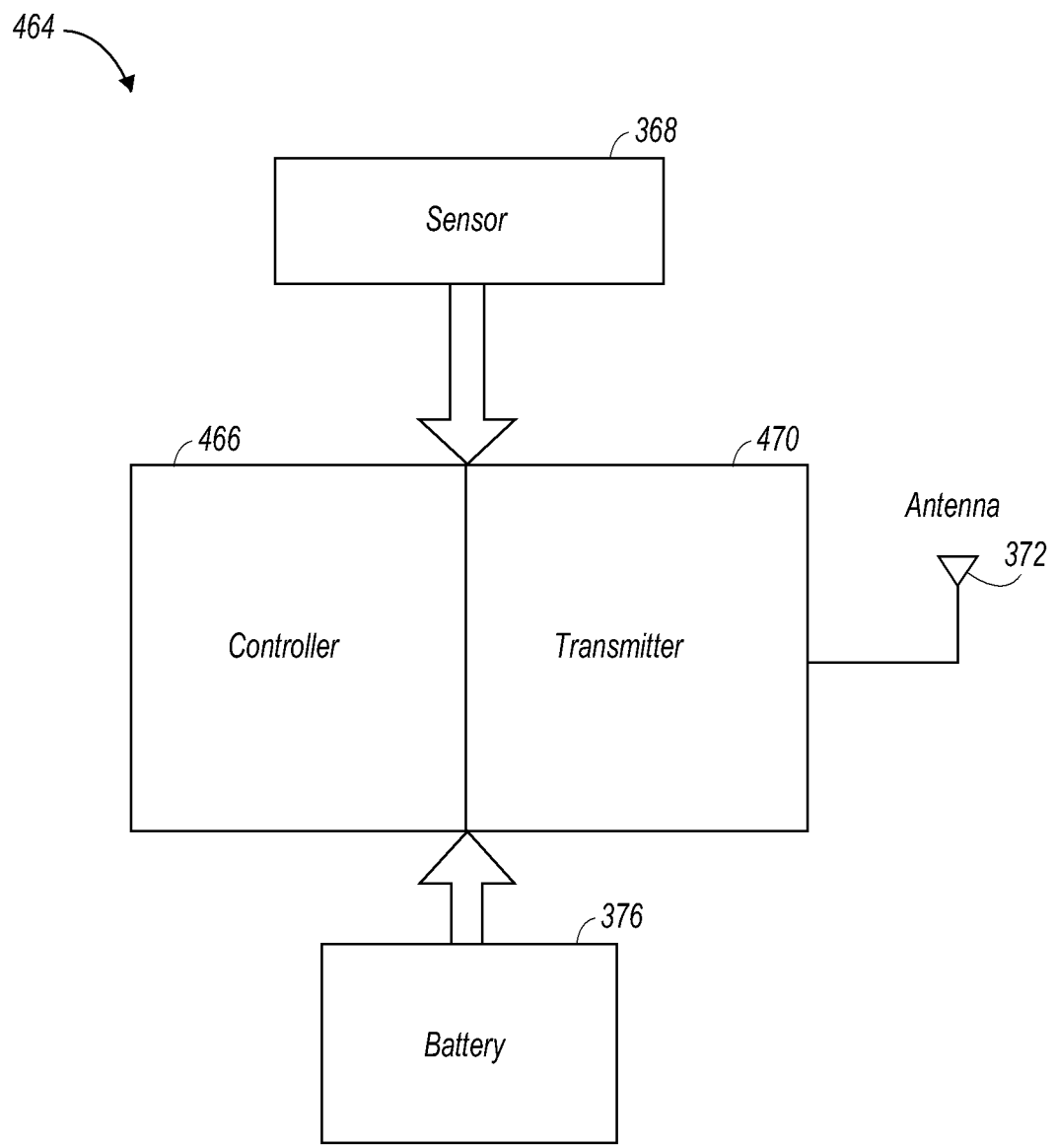
FIG. 4 is a block diagram of an exemplary sensing transmitter, according to other embodiments.

FIGS. 3 and 4 illustrate embodiments of a sensing transmitter 364, 464. In the embodiment illustrated in FIG. 3, the transmitting sensor 364 comprises a combination microcontroller and RF transmitter 374, such as a RFPIC12F675, which includes an amplitude shift keying (ASK) encoding scheme, and is available from Microchip Technology, or the equivalent. In the embodiment illustrated in FIG. 4, the transmitting sensor 464 comprises a separate microcontroller 466, such as a PIC12F675 available from Microchip Technology or the equivalent, and a separate RF transmitter 470. In other embodiments, other digital or analog encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK), Binary Phase Shift Keying (BPSK), Quadrature Phase Shift Keying (QPSK), Pulse Amplitude Modulation (PAM), Quadrature Amplitude Modulation (QAM), and the like, could be used.

The transmitting sensors 364, 464 also comprise a high capacity lithium battery, such as a TL4955 available from Tadiran, or the equivalent. The transmitting sensor 364, 464 further comprises one or more sensors 368. For example, the sensor 368 may be an ambient light sensing sensor, such as the SFH5711 ambient light sensor available from OSRAM, a motion sensing sensor such as the EKMC1603112 PIR motion sensor available from Panasonic, occupancy sensors, proximity sensors, vacancy sensors, photodetectors, infrared (IR) sensors, ultraviolet (UV) sensors, temperature sensors, and the like. In other embodiments, the sensor 368 comprises environmental sensors, such as temperature sensors, humidity sensors, barometers, anemometers, rain gauges, soil moisture sensors, solar radiation sensors, and the like, as described above with respect to the weather station 24. It should be noted that many other equivalent devices could have been used. For instance, the Tadiran battery could be replaced with a rechargeable battery and a solar panel.

Figure 5A:
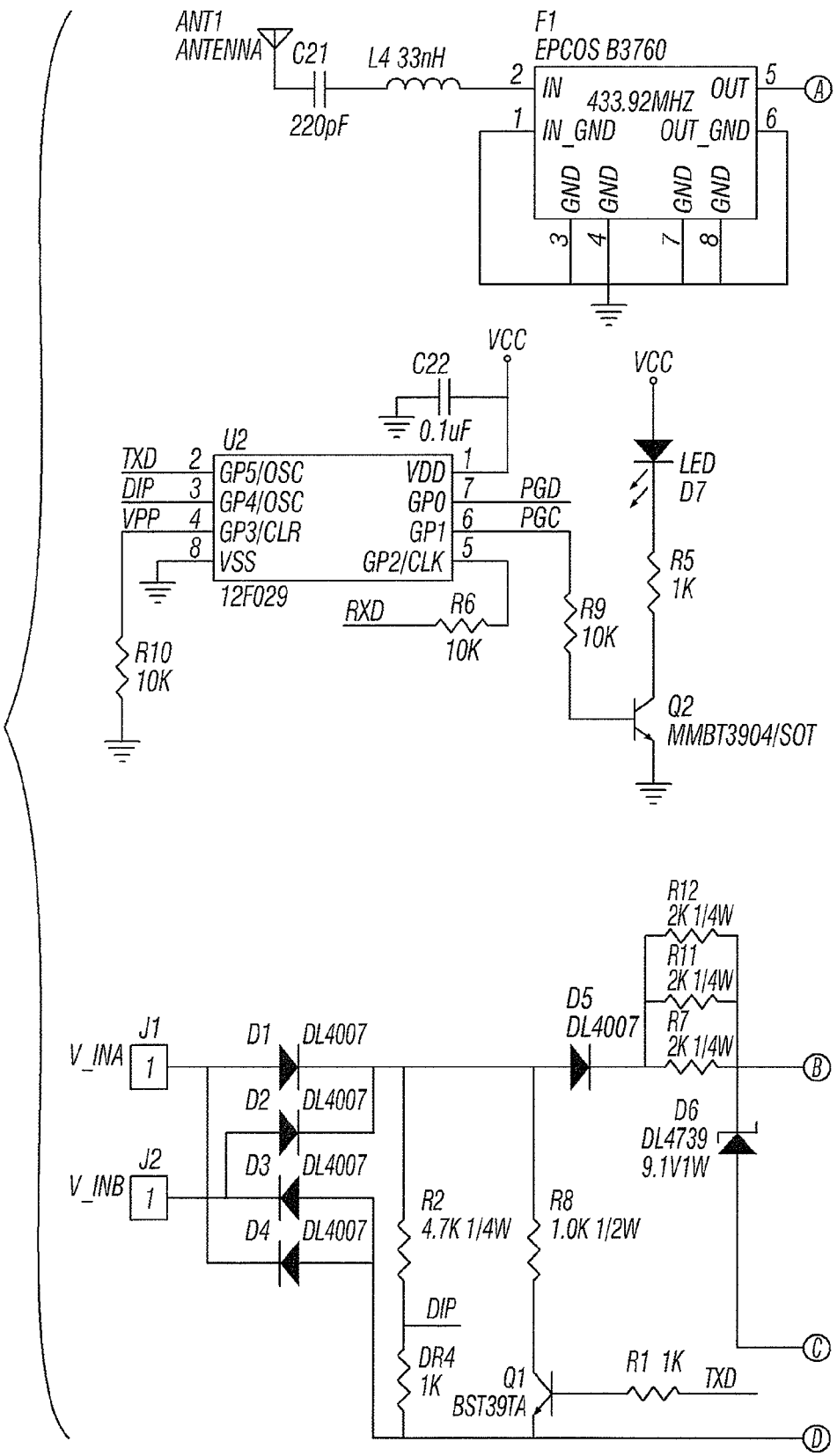
FIGS. 5A and 5B are an exemplary schematic diagram of the circuitry of the data relay that forms part of the system of FIGS. 1 and 2.
Figure 5B:
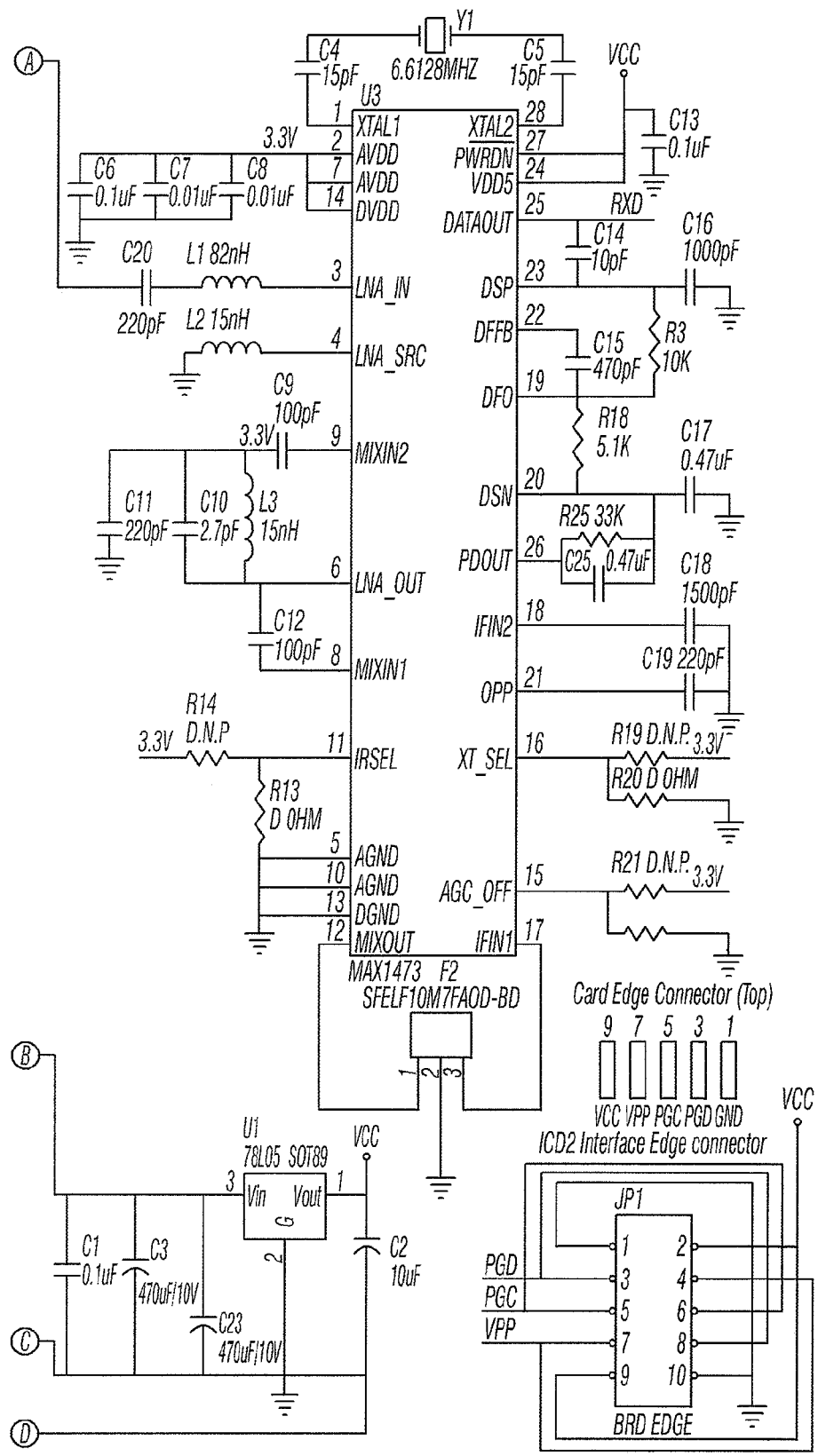

FIGS. 5A and 5B are a schematic diagram of an embodiment of the circuitry of the data relay 12, 52. Incoming RF signals are first coupled to the receiving antenna 26, 66, and then routed to a surface acoustic wave (SAW) filter, F1, which rejects any strong out-of-band signals that would otherwise "blind" an RF receiver. The SAW filter may be a type B3760 manufactured by Epcos. This particular model is designed to pass signals in the 434 MHZ band. After the filter, the RF signal is presented to RF receiver IC U3 after passing through matching components which assure the maximum possible energy is transferred to the IC. The receiver itself may be a type MAX1473 available from Maxim Integrated Products. This receiver IC is highly integrated and provides low noise amplifier (LNA), phased locked loop (PLL), local oscillator (LO), and mixer circuitry internal to the part. Specifically, a reference crystal Y1 of approximately 6.6128 MHZ is fed into a phase locked loop in order to create a local oscillator frequency of approximately 423.22 MHZ. This LO signal is mixed with an amplified version of the incoming RF signal to generate the intermediate frequency (IF) signal. This signal is amplified and brought out of the chip for filtering. The designer has a choice of intermediate frequency (IF) filtering options. In an embodiment, the design uses a 230 KHZ filter centered around approximately 10.7 MHZ in order to filter the IF signal. This filter, for example, is a type SFTLA10M7FA00-B0 available from Murata. The filtered IF signal is then fed back into the receiver where a demodulator using the demodulation process retrieves the baseband data signal that was transmitted by the sensor 24, 64, 364, 464 and presents it to microcontroller U2. This may be a type PIC12F629 available from Microchip Technology, for example. The microcontroller U2 parses the data, determines the actual value of the parameter of interest, and then drives the current modulation circuitry or current modulator, which is comprised of bipolar Transistor Q1 and resistor R8, in a fashion that emulates the physical and protocol properties of the hard-wired link. In other embodiments, the microcontroller U2 parses the data, determines the actual value of the parameter of interest, and then drives a voltage modulation circuitry or voltage modulator in a fashion that emulates the physical and protocol properties of the hard-wired link. U1 is a simple linear voltage regulator such as a LM78L05, for example, which takes the unregulated excitation voltage on the two-wire path and generates a regulated 5 VDC signal to power the microcontroller and RF circuitry. Diodes D1-D4 form an incoming bridge rectifier which eliminates any polarity sensitivity of the incoming two-conductor signal.

Figure 7:
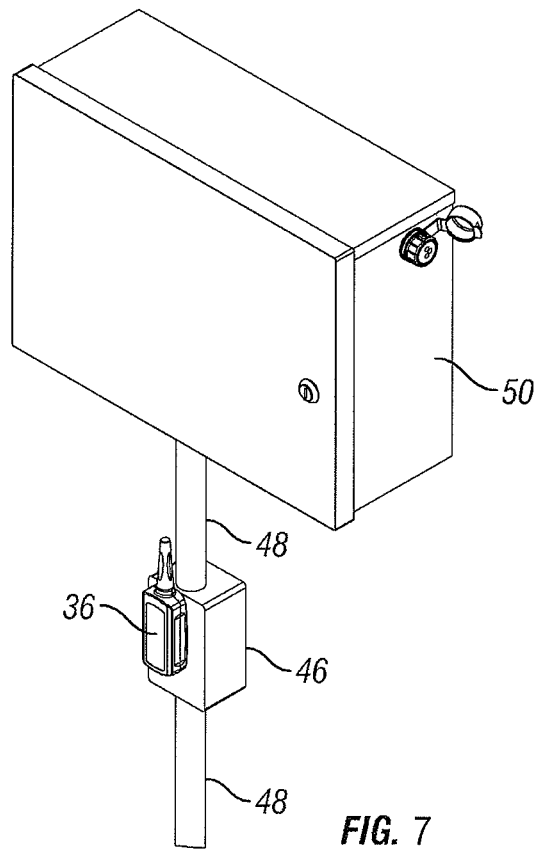
FIG. 7 is an isometric view of the data relay module of FIGS. 6A, 6B and 6C attached to a junction box connected to electrical conduit, according to certain embodiments.
Figure 8:
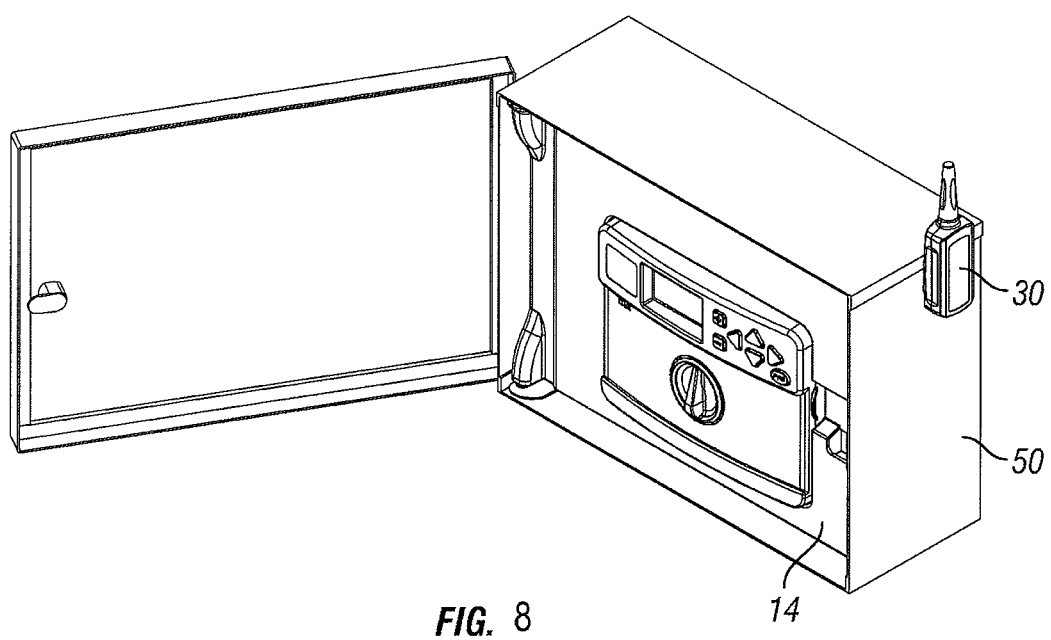
FIG. 8 is an isometric view of the data relay module of FIGS. 6A, 6B, and 6C mounted on a metallic box that houses a controller, according to certain embodiments.

The data relays 12, 52 can be configured in the form of a compact data relay module. FIGS. 6A, 6B and 6C are front isometric, rear isometric and vertical sectional views, respectively, of a data relay module 36 and FIGS. 7 and 8 illustrate mounting embodiments of the data relay module 36. Because of the level of integration available in modern IC's, the RF circuitry, microcontroller to supervise it, and power supply can fit on a printed circuit board (PCB) 38 (FIG. 6C) measuring, in an embodiment, about one to two square inches in area. In other embodiments, other sizes of the PCB can be used, as is known to one of skill of the art. The PCB 38 is housed inside a compact rectangular outer housing 40 that supports the short antenna 26, 66. The antenna 26, 66 is embedded inside an outer protective jacket 42. The outer housing 40 includes a hollow cylindrical stub 44 (FIG. 6B) with a standard male pipe thread that allows it to be screwed into any standard pipe fitting with a female thread such as provided on an electrical junction box 46 connected to electrical conduit 48 leading to an electrical junction box 50 containing the controller 14, 54 as illustrated in FIG. 7. The cylindrical stub 44 may also be inserted through a standard knock-out through the side wall of the electrical junction box 50 as illustrated in FIG. 8. The electrical junction box 50 may be made of sheet metal, such as stainless steel sheet metal or it may be made of plastic. Wires (not illustrated) pass from the data relay circuitry of FIGS. 5A and 5B to the controller 14, 54 through the bore 48 of the stub 44.

The data relay module 36 emulates the physical and protocol layers of the hard-wired communications link otherwise used to connect to the sensors 28, 368. The physical configuration of the data relay module 36 has a number of practical advantages. For example, it provides the capability of mounting the data relay module 36 outside of a metal box, thereby providing a wireless solution into a metal enclosure, which would otherwise shield and prevent the entry any RF signal containing information from environmental sensors. This solution is different than simply providing relay circuitry inside the metal enclosure and connecting the same to an antenna mounted outside of the metal enclosure which may not be vandal resistant. The antenna would have to be connected to the RF receiver using special coaxial RF cabling which is both costly and difficult to splice. Furthermore, the more cable that is added, the greater the RF loss and lower the range for the system. The data relay module 36 provides an integrated and optimal RF solution which places the antenna 26, 66 as close as possible to the receiver, while allowing the remote function to be accomplished with any kind of cable.

The controller 14, 54 may not be in an area conducive to wireless reception. For instance, the controller 14, 54 may be mounted on wall inside a garage which has metallic siding on the outside that shields the RF signals. The controller 14, 54 may be mounted in a basement which is subterranean and receives very little RF energy. In these situations, the data relay module 36 may be mounted in a location that allows for better reception such as on the outside wall of the garage, and hard-wired to the controller 14, 54.

While embodiments of the data relay 12, 52 described herein are particularly suited for use in an irrigation system and a lighting system, it will be apparent to those skilled in the art that the data relay 12, 52 can be used in other applications. In addition, modifications and adaptations of the data relay 12, 52 will occur to one of skill in the art from the disclosure herein.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A lighting system comprising:
   a sensor configured to detect at least one parameter;
   a lighting controller comprising a hard-wired communications link and configured to accept a value of the at least one parameter from said sensor in the form of data encoded on conductors of said hard-wired communication link according to predetermined properties of said hard-wired communication link, wherein said sensor is located remotely from said lighting controller; and
   a data relay electrically connected to said hard-wired communication link, said data relay comprising a receiver configured to receive an RF signal representing a value of said at least one parameter detected by said sensor, and circuitry configured to extract said value from said received RF signal and encode said value on said conductors by emulating said predetermined properties.

2. The lighting system of claim 1 wherein the data relay emulates physical and protocol properties of the hard-wired communication link.

3. The lighting system of claim 1 wherein the lighting controller is configured to turn ON and OFF one or more lighting modules based at least in part on the value of the parameter.

4. The lighting system of claim 1 wherein the sensor comprises one or more of an ambient light sensor, a motion sensor, an occupancy sensor, a proximity sensor, a vacancy sensor, a photodetector, an infrared (IR) sensor, an ultraviolet (UV) sensor, and a temperature sensor.

5. The lighting system of claim 1 wherein the data relay encodes the value on the conductors by one of current modulation and voltage modulation.

6. A lighting system comprising:
   at least one transmitting sensor comprising a sensor configured to detect at least one parameter and a radio frequency (RF) transmitter configured to transmit an RF signal representing a value of said at least one parameter detected by said sensor;
   a lighting controller comprising a hard-wired communications link and configured to accept said value from said sensor in the form of data encoded on conductors of said hard-wired communication link according to a predetermined set of physical and protocol properties of said hard-wired communication link, wherein said sensor is located remotely from said lighting controller; and
   a data relay electrically connected to said hard-wired communication link, said data relay comprising a receiver configured to receive said RF signal, and circuitry configured to extract said value from said received RF signal and encode said value on said conductors by emulating said predetermined set of physical and protocol properties.

7. The lighting system of claim 6 wherein the sensor comprises one or more of an ambient light sensor and a motion sensor.

8. The lighting system of claim 6 wherein the data relay further comprises a demodulator configured to extract the value from the received RF signal.

9. The lighting system of claim 6 wherein the data relay further comprises a processor configured to drive a modulator to emulate the predetermined set of physical and protocol properties.

10. The lighting system of claim 9 wherein the modulator is configured to modulate the value onto the conductors.

11. A lighting system comprising:
    at least one transmitting sensor comprising a sensor configured to detect at least one parameter of interest and a radio frequency (RF) transmitter configured to transmit an RF signal representing an actual value of said at least one parameter of interest detected by said sensor;
    a lighting controller comprising a hard-wired communications link and configured to accept said actual value of the at least one parameter of interest from said sensor in the form of data encoded on conductors of said hard-wired communication link via current or voltage modulation according to a predetermined set of physical and protocol properties of said hard-wired communication link, wherein said sensor is located remotely from said lighting controller; and
    a data relay electrically connected to said hard-wired communication link of said lighting controller, said data relay comprising a receiver configured to receive said RF signal, and circuitry configured to extract said actual value of the at least one parameter of interest from said received RF signal and encode said actual value of the at least one parameter of interest on said conductors of said hard-wired communication link via said current or said voltage modulation by emulating said predetermined set of physical and protocol properties of the hard-wired communication link of the lighting controller.

12. The lighting system of claim 11 wherein the lighting controller is housed within a vandal resistant housing.

13. The lighting system of claim 12 wherein the data relay is mounted outside the vandal resistant housing.

14. The lighting system of claim 11 wherein the data relay further comprises an antenna electrically coupled to the receiver.

15. The lighting system of claim 14 wherein the antenna is configured to be embedded inside an outer protective jacket.

16. A data relay comprising:
    a receiver configured to receive a wireless signal from a remote sensor, the wireless signal responsive to a sensed condition relating to lighting control;
    a processor configured to process said received signal to determine data responsive to said sensed condition; and
    an output communicating with one or more conductors of a hard-wired communication link, the processor configured to emulate signals expected by a controller over said hard-wired communication link responsive to said data as if said controller were communicating over said hard-wired communication link with said remote sensor.

17. The data relay of claim 16 further comprising a current modulator controlled by the processor and configured to modulate a value of the data onto the output.

18. The data relay of claim 16 further comprising a voltage modulator controlled by the processor and configured to modulate a value of the data onto the output.

19. The data relay of claim 16 further comprising an antenna electrically connected to the receiver and configured to receive the wireless signal.

20. The data relay of claim 16 further comprising a vandal resistant housing.

* * * * *